United States Patent
Kim

(10) Patent No.: US 9,406,981 B2
(45) Date of Patent: Aug. 2, 2016

(54) BATTERY SYSTEM AND ENERGY STORAGE SYSTEM INCLUDING THE SAME

(75) Inventor: Jae-Soon Kim, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 927 days.

(21) Appl. No.: 13/312,541

(22) Filed: Dec. 6, 2011

(65) Prior Publication Data

US 2012/0183813 A1 Jul. 19, 2012

Related U.S. Application Data

(60) Provisional application No. 61/433,887, filed on Jan. 18, 2011.

(51) Int. Cl.

| | |
|---|---|
| *H01M 10/42* | (2006.01) |
| *H01M 10/46* | (2006.01) |
| *H01M 10/48* | (2006.01) |
| *H01M 2/10* | (2006.01) |
| *H01M 2/34* | (2006.01) |

(52) U.S. Cl.
CPC .......... *H01M 10/465* (2013.01); *H01M 10/425* (2013.01); *H01M 10/482* (2013.01); *H01M 2/1077* (2013.01); *H01M 2/348* (2013.01); *H01M 2010/4271* (2013.01); *H01M 2200/103* (2013.01); *H01M 2220/10* (2013.01)

(58) Field of Classification Search
None
See application file for complete search history.

(56) References Cited

U.S. PATENT DOCUMENTS

| | | | |
|---|---|---|---|
| 2006/0076926 A1* | 4/2006 | Lee | 320/112 |
| 2009/0257161 A1 | 10/2009 | Liu et al. | |
| 2009/0267568 A1 | 10/2009 | Lim | |
| 2010/0050800 A1* | 3/2010 | Michishita | 74/421 A |
| 2011/0068745 A1* | 3/2011 | Milios | 320/118 |
| 2013/0271072 A1* | 10/2013 | Lee et al. | 320/108 |

FOREIGN PATENT DOCUMENTS

| | | |
|---|---|---|
| JP | 2002-078214 A | 3/2002 |
| KR | 10-2009-0081894 A | 7/2009 |

(Continued)

OTHER PUBLICATIONS

Korean Notice of Allowance dated Jan. 29, 2014 for Korean Patent Application No. KR 10-2012-0002459 which claims priority from U.S. Appl. No. 61/433,887, filed Jan. 18, 2011, and captioned U.S. Appl. No. 13/312,541, and cites above-identified reference Nos. 1-3.

*Primary Examiner* — Patrick Ryan
*Assistant Examiner* — Wyatt McConnell
(74) *Attorney, Agent, or Firm* — Knobbe, Martens, Olson & Bear, LLP

(57) ABSTRACT

A battery system including a stably operating battery management unit and an energy storage system including the battery system is disclosed. The battery system includes a battery rack configured to store and provide power, a rack protection circuit configured to selectively connect and disconnect the battery rack to and from the input/output terminal, and a rack battery management system (BMS) configured to communicate with the battery rack and with the rack protection circuit. The rack BMS receives data from the battery rack and generates control signals for the rack protection circuit. In addition, the rack protection circuit includes a current path between the battery rack and the input/output terminal, and the rack BMS is excluded from the current path.

23 Claims, 5 Drawing Sheets

(56) References Cited

FOREIGN PATENT DOCUMENTS

| KR | 10-2010-0060725 A | 6/2010 |
| KR | 10-0965743 B1 | 6/2010 |
| KR | 10-2010-0108129 A | 10/2010 |

\* cited by examiner

BATTERY SYSTEM AND ENERGY STORAGE SYSTEM INCLUDING THE SAME

CROSS-REFERENCE TO RELATED APPLICATIONS

This application claims priority to U.S. Provisional No. 61/433,887, titled "BATTERY SYSTEM AND ENERGY STORAGE SYSTEM INCLUDING THE SAME" filed Jan. 18, 2011, which is hereby incorporated by reference in its entirety.

BACKGROUND OF THE INVENTION

1. Field of the Invention

The disclosed technology relates to a battery system and an energy storage system including the battery system.

2. Description of the Related Art

As problems, such as environmental contamination and resource exhaustion, increase, interest in systems for storing energy and efficiently using the stored energy also increases. There is also increased interest in renewable energy that does not cause pollution during power generation. Thus, research into energy storage systems, which may be used with renewable energy, a power storage battery system, and an existing grid power, has been actively conducted.

Energy storage systems may include battery systems which store and provide power according to an amount of power needed for the load. Battery systems may receive power supplied from an external source, store the supplied power, and supply the stored power. That is, battery systems may perform charging and discharging operations. In this regard, battery systems include protection circuits to stably perform the charging and discharging operations.

SUMMARY OF CERTAIN INVENTIVE ASPECTS

One inventive aspect is a battery system, which includes a battery rack configured to provide power to an input/output terminal and to store power from the input/output terminal, and a rack protection circuit connected to the battery rack, where the rack protection circuit is configured to selectively connect and disconnect the battery rack to and from the input/output terminal. The system also includes a rack battery management system (BMS) configured to communicate with the battery rack and with the rack protection circuit, where the rack BMS is configured to receive data from the battery rack and to generate control signals for the rack protection circuit. The rack protection circuit includes a current path between the battery rack and the input/output terminal, and the rack BMS is excluded from the current path.

Another inventive aspect is a battery system, which includes a plurality of sub-battery systems configured to provide power to a system input/output terminal and to store power from the system input/output terminal. Each sub-battery system includes a battery rack configured to provide power to a sub-battery system input/output terminal and to store power from the sub-battery system input/output terminal. The sub-battery system also includes a rack protection circuit connected to the battery rack, where the rack protection circuit is configured to selectively connect and disconnect the battery rack and the sub-battery system input/output terminal, and a rack battery management system (BMS) configured to communicate with the battery rack and with the rack protection circuit, where the rack BMS is configured to receive data from the battery rack and to generate control signals for the rack protection circuit based on the data from the battery rack. The battery system also includes an integrated protection circuit connected to the sub-battery systems, and a system BMS configured to communicate with the rack BMS of each of the-sub battery systems and with the integrated protection circuit. The system BMS is configured to receive data from the sub-battery systems and to generate control signals for the integrated protection circuit. In addition, the integrated protection circuit includes a current path between the system input/output terminal and sub-battery system input/output terminals, and the system BMS does not include the current path.

DETAILED DESCRIPTION OF CERTAIN INVENTIVE EMBODIMENTS

Figure 1:
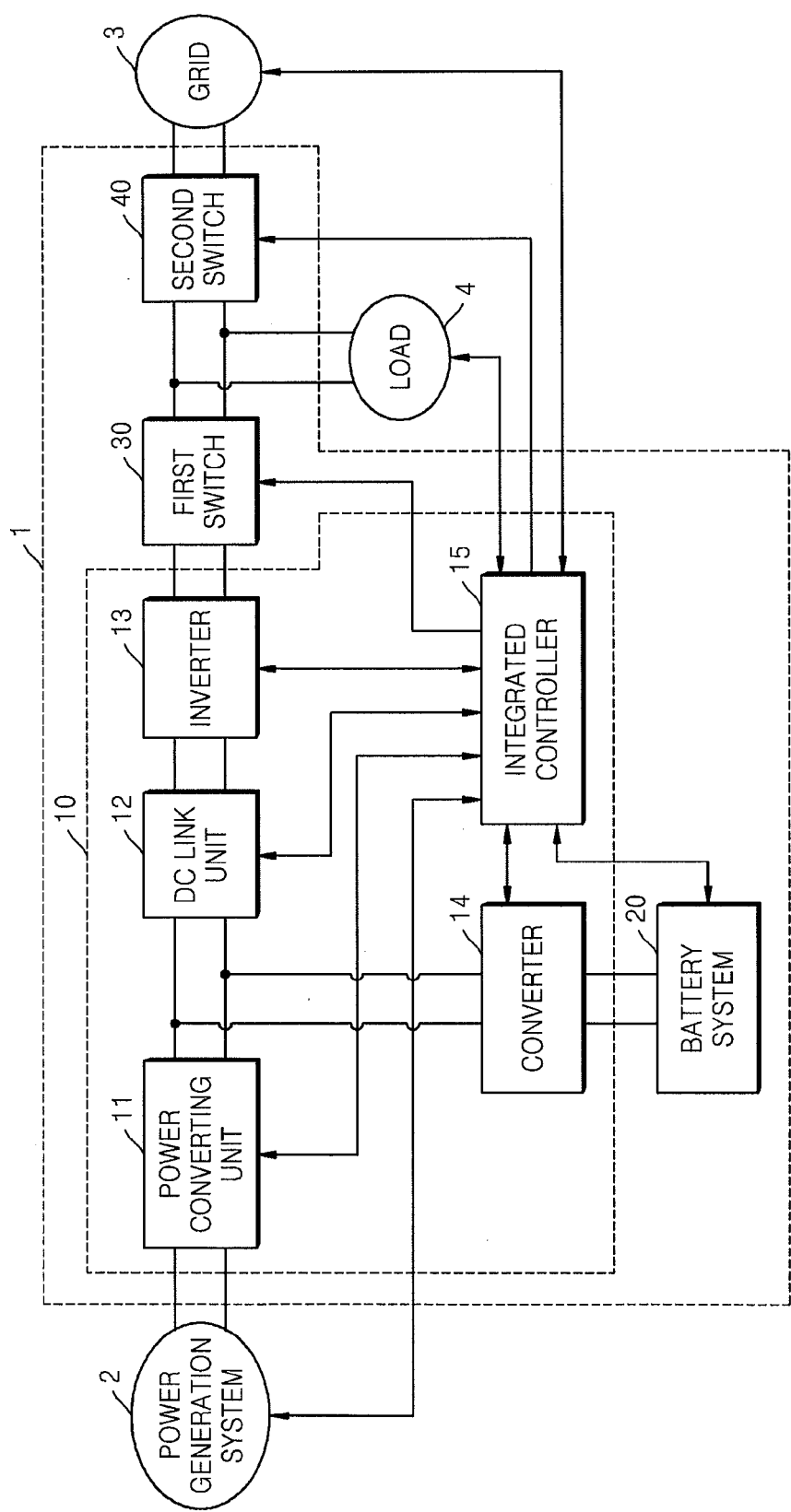
FIG. 1 is a block diagram of an energy storage system according to an embodiment.

In order to describe the various aspects and features, particular embodiments are illustrated in the drawings and described in detail in the written description. However, the specification is not intended to limit the present invention to particular modes of practice, and it is to be appreciated that changes, equivalents, and substitutes can be made without deviating from the spirit and technical scope of the present invention. In the description, certain detailed explanations of related art are omitted when it is deemed that they may obscure the essence of the various aspects.

Reference is made to embodiments, examples of which are illustrated in the accompanying drawings. In the drawings, similar elements are generally denoted by the same reference numerals. In addition, repeated explanation of certain similar elements may not be given.

FIG. 1 is a block diagram of an energy storage system 1 according to an embodiment. The energy storage system 1 supplies power to a load 4 received from a power generation system 2 and a grid 3.

The power generation system 2 generates power according to an energy source. The power generation system 2 supplies the generated power to the energy storage system 1. The power generation system 2 may be, for example, a solar power generation system, a wind power generation system, a tidal power generation system or a geothermal power generation system. However, the power generation system 2 may be any power generation system that generates power by using any energy source. In particular, a solar power source generating electrical energy using sunlight may be applied to the energy storage system 1. Using the energy storage system 1, the power from the power generation system 2 may be distributed to, for example, houses and factories. The power generation system 2 may include a high-capacity energy system which generates power by using a plurality of power generation modules.

The grid 3 may include a power plant, a substation, power lines, and the like. If the grid 3 is in a normal state, the grid 3 supplies power to the energy storage system 1 to supply the power to the load 4 and/or a battery system 20. In addition, the grid 3 may receive power from the energy storage system 1. If the grid 3 is in an abnormal state, the grid 3 does not supply power to the energy storage system 1, and the energy storage system 1 does not supply power to the grid 3.

The load 4 consumes power generated by the power generation system 2, power stored in the battery system 20, and/or power supplied from the grid 3. A house or a factory may optionally be included in the load 4.

The energy storage system 1 may store power generated by the power generation system 2 in the battery system 20, and transmit the generated power to the grid 3. The energy storage system 1 may supply power stored in the battery system 20 to the grid 3, or store power supplied from the grid 3 in the battery system 20. In an abnormal situation, for example, if there is a power failure in the grid 3, the energy storage system 1 may supply power to the load 4 by performing an uninterruptible power supply (UPS) operation. Even if the grid 3 is in a normal state, the energy storage system 1 may supply power generated by the power generation system 2 or power stored in the battery system 20 to the load 4.

The energy storage system 1 of the shown embodiment includes a power conversion system (PCS) 10 that controls power conversion, the battery system 20, a first switch 30, and a second switch 40.

The PCS 10 converts power received from the power generation system 2, the grid 3, and the battery system 20 into a suitable form for any of the grid 3, the load 4, and the battery system 20. The PCS 10 converts power to and from the input/output terminal, wherein conversion is at least one of between DC and AC and between a first voltage and a second voltage. The PCS 10 supplies the converted power to the appropriate destination according to the mode of operation as controlled by an integrated controller 15. The PCS 10 includes a power converting unit 11, a direct current (DC) link unit 12, an inverter 13, a converter 14, and the integrated controller 15.

The power converting unit 11 is connected between the power generation system 2 and the DC link unit 12, and delivers power generated by the power generation system 2 to the DC link unit 12. An output voltage from the power converting unit 11 is at a DC link voltage.

The power converting unit 11 may include a power conversion circuit, such as a converter, a rectifier circuit, etc. according to the type of the power generation system 2. For example, if the power generation system 2 generates DC power, the power converting unit 11 may include a converter for converting the voltage level of the DC power of the power generation system to a voltage level of the DC power of the DC link unit 12. If, however, the power generation system 2 generates alternating current (AC) power, the power converting unit 11 may include a rectifier circuit for converting the AC power to DC power. In particular, if the power generation system 2 is a solar power generation system, the power converting unit 11 may include a maximum power point tracking (MPPT) converter so as to obtain maximum power output from the power generation system 2 according to in the changing state of solar radiation, temperature, or the like. When the power generation system 2 generates no power, the power converting unit 11 may stop operating to minimize power consumption.

The DC link voltage may become unstable due to an instantaneous voltage drop of the power generation system 2 or the grid 3 or a sudden change or a high level in the power demand of the load 4. However, the DC link voltage is to be stabilized to normally operate the inverter 13 and the converter 14. The DC link unit 20 is connected between the power converting unit 11 and the inverter 13 and maintains the DC link voltage. The DC link unit 12 may comprise, for example, a mass storage capacitor, etc.

The inverter 13 is a power converter connected between the DC link unit 12 and the first switch 30. The inverter 13 may include an inverter that converts the DC link output voltage from the DC link unit 12 into an alternating current (AC) voltage for the grid 3 and outputs the AC voltage in a discharging mode. The inverter 13 may include a rectifier circuit that rectifies the AC voltage output from the grid 3 into the DC link voltage so that power from the grid 3 may be stored in the battery system 20 in a charging mode. That is, the inverter 13 may be a bidirectional inverter in which directions of input and output are changeable.

The inverter 13 may include a filter for removing harmonics from the AC voltage output to the grid 3, and a phase-locked loop (PLL) circuit for matching the phase of the AC voltage output from the inverter 13 to the phase of the AC voltage of the grid 3 in order to prevent reactive power loss. Also, the inverter 13 may perform other functions such as restriction of voltage variation range, power factor correction, removal of DC components, and protection against transient phenomena. When the inverter 30 is not used, the operation of the inverter 13 may be stopped so as to minimize power consumption.

The converter 14 is a power converter that is connected between the DC link unit 12 and the battery system 20. The converter 14 includes a DC-DC converter to convert a voltage of the power output from the battery system 20 to the DC link voltage for the inverter 13 in a discharge mode. The converter 14 also includes a DC-DC converter that converts a voltage of the power output from the power converting unit 11 or the inverter 13 into a voltage level for the battery system 20 in a charge mode. That is, the converter 14 may be a bidirectional converter in which directions of input and output are changeable. The converter 14 may stop an operation thereof and minimize power consumption thereof when it is not used to charge or discharge the battery system 20.

The integrated controller 15 monitors the states of the power generation system 2, the grid 3, the battery system 20, and the load 4, and controls the power converting unit 11, the inverter 13, the converter 14, the battery system 20, the first switch 30, and the second switch 40 according to results of the monitoring. The integrated controller 15 may monitor whether a power failure occurs in the grid 3, whether the power generation system 2 generates power, an amount of power generated by the power generation system 2, a charge state of the battery system 20, an amount of power consumed by the load 4, time, and the like. If power to be supplied to the load 4 is insufficient because, for example, a power failure occurs in the grid 3, the integrated controller 15 may control the load 4 to determine priorities for devices which use power included in the load 4 and supply power to the devices which use power having high priorities.

The first switch 30 and the second switch 40 are connected in series between the inverter 13 and the grid 3, and control the flow of current between the power generation system 2 and the grid 3 by being turned on or off under the control of the integrated controller 15. The first switch 30 and the second switch 40 may be turned on or off according to states of the power generation system 2, the grid 3, and the battery system 20.

More specifically, to supply power from the power generation system 2 and/or from the battery system 20 to the load 4 or to supply power from the grid 3 to the battery system 20, the first switch 30 is turned on. To supply power from the power generation system 2 and/or the battery system 20 to the grid 3 or to supply power from the grid 3 to the load 4 and/or the battery system 20, the second switch 40 is turned on. Switching devices like relays capable of enduring a large current may be used as the first switch 30 and the second switch 40.

If there is a power failure in the grid 3, the second switch 40 is turned off and the first switch 30 is turned on. Accordingly, power from the power generation system 2 and/or the battery system 20 may be supplied to the load 4, but may not flow into the grid 3. The isolation of the energy storage system 1 from the failing grid 3 prevents the energy storage system 1 from supplying power to the grid 3. Accordingly, a worker who works at a power distribution line of the grid 3 to, for example, fix the failure in grid 3, will not receive an electric shock from the power of the energy storage system 1.

The battery system 20 receives and stores power generated by the power generation system 2 and/or power output from the grid 3, and supplies power stored to the load 4 or the grid 3. The battery system 20 may include a portion for storing power and a portion for controlling and protecting the portion for storing power. Hereinafter, the construction of the battery system 20 will be described in detail with reference to FIG. 2.

Figure 2:
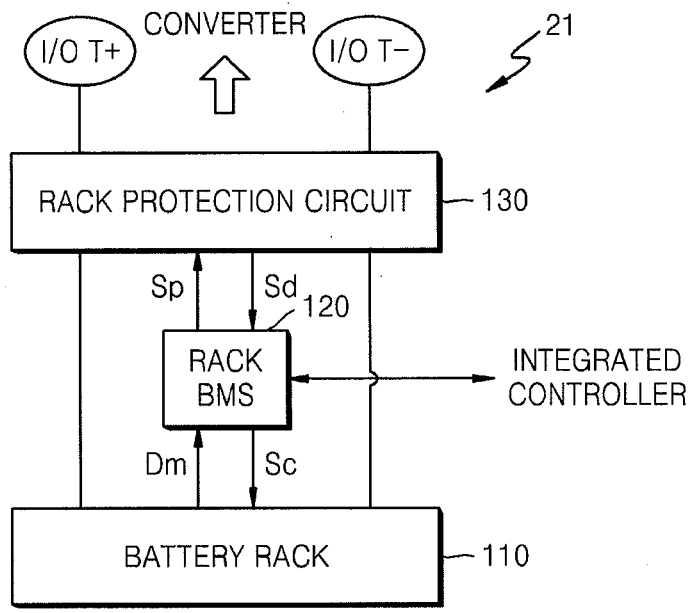
FIG. 2 is a block diagram of a battery system according to an embodiment.

FIG. 2 is a block diagram of a battery system 21 according to an embodiment. Referring to FIG. 2, the battery system 21 includes a battery rack 110, a rack battery management system (BMS) 120, and a rack protection circuit 130.

The battery rack 110 stores power supplied from the power generation system 2 and/or the grid 3, and supplies the stored power to the power generation system 2 and/or the grid 3. The battery rack 110 may include a plurality of subunits, which will be described in detail with reference to FIGS. 3 and 4.

Figure 3:
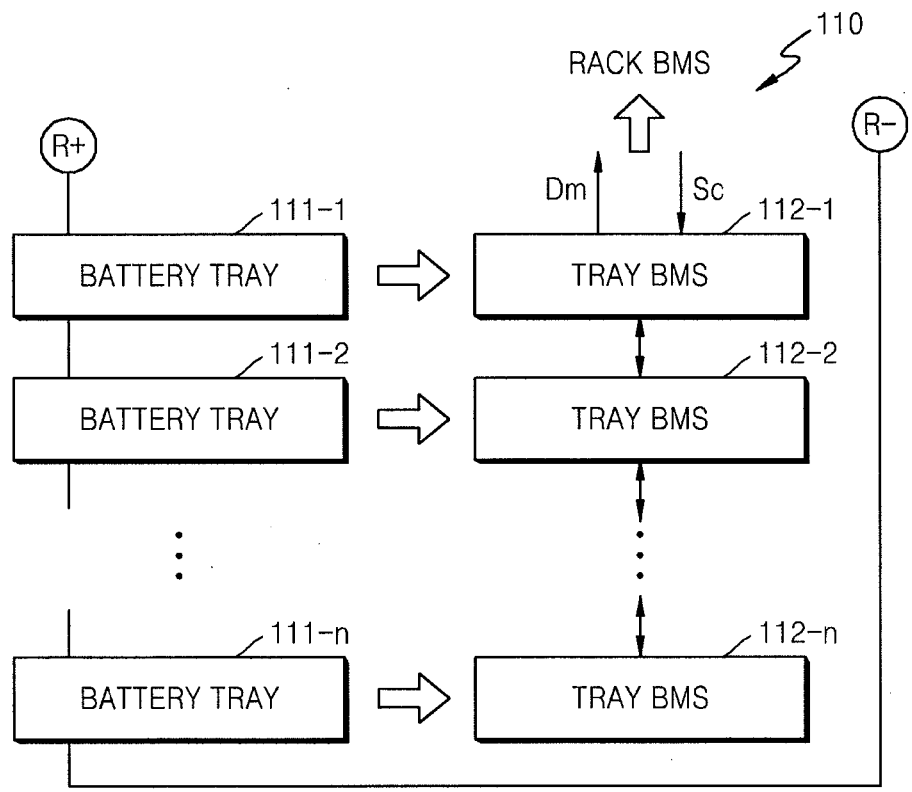
FIG. 3 is a block diagram of a battery rack according to an embodiment.

FIG. 3 is a block diagram of the battery rack 110 according to an embodiment. Referring to FIG. 3, the battery rack 110 may include one or more battery trays 111-1, . . . 111-n that are connected to each other in series and/or in parallel as subunits. Each of the battery trays 111-1, . . . 111-n may include a plurality of battery cells as subunits. The battery cells may use various rechargeable secondary batteries. For example, secondary batteries used in the battery cells may include one or more of a nickel-cadmium battery, a lead acid battery, a nickel metal hydride (NiMH) battery, a lithium ion battery, a lithium polymer battery, and the like.

The battery rack 110 may provide a desired output according to how the battery trays 111-11, . . . 111-n are connected, and output power to the rack protection circuit 130 through a positive output terminal R+ and a negative output terminal R−.

The battery rack 110 may include one or more tray BMSs 112-1, . . . 112-n respectively corresponding to the battery trays 111-1, . . . 111-n. The tray BMSs 112-1, . . . 112-n monitor voltages, current, temperatures, etc. of the respectively corresponding battery trays 111-1, . . . 111-n. The tray BMSs 112-1, . . . 112-n may transmit results of the monitoring to the neighboring tray BMSs 112-1, . . . 112-n.

The monitoring results of the tray BMSs 112-1, . . . 112-n may be collected by a single tray BMS 112-1. Collected monitoring data Dm is transmitted to the rack BMS 120. The tray BMS 112-1 may receive a control signal Sc for controlling a charge or a discharge of the battery rack 110 from the rack BMS 120. Although the tray BMS 112-1 positioned highest collects the monitoring results and receives the control signal Sc in the present embodiment, other arrangements are possible. For example, the tray BMS 112-n that is positioned lowest may collect the monitoring results and receive the control signal Sc. Also, in some embodiments, the tray BMS that collects the monitoring results and transmits the monitoring data Dm to the rack BMS 120 and the tray BMS that receives the control signal Sc may be different.

Referring to FIG. 2, the rack BMS 120 is connected to the battery rack 110 and controls charging and discharging operations of the battery rack 110. The rack BMS 120 may perform overcharge protection, over-discharge protection, over-current protection, overvoltage protection, overheat protection, cell balancing, etc. To this end, the rack BMS 120 may receive the monitoring data Dm regarding a voltage, a current, a temperature, a remaining amount of power, a lifetime, and a state of charge, etc. from the battery rack 110, generate the control signal Sc according to the results of the monitoring data Dm, and control the rack protection circuit 130. The rack BMS 120 may apply the received monitoring data Dm to the integrated controller 15, and receive a command relating to a control of the battery rack 110 from the integrated controller 15.

The rack protection circuit 130 is connected between the battery rack 110 and input/output terminals I/O T+ and I/O T−, which are connected to the converter 14, and prevents the battery rack 110 from being damaged. The rack protection circuit 130 may receive a control signal Sp from the rack BMS 120 and control a flow of current according to the control signal Sp. The rack protection circuit 130 also may measure an output voltage or current of the battery rack 110 and transmit a measurement signal Sd to the rack BMS 120. In this regard, the rack protection circuit 130 may be physically separated from the rack BMS 120. Accordingly, the rack BMS 120 may be formed as a separate piece from the rack protection circuit, and therefore may be protected from a high current path of the rack protection circuit 130.

Figure 4:
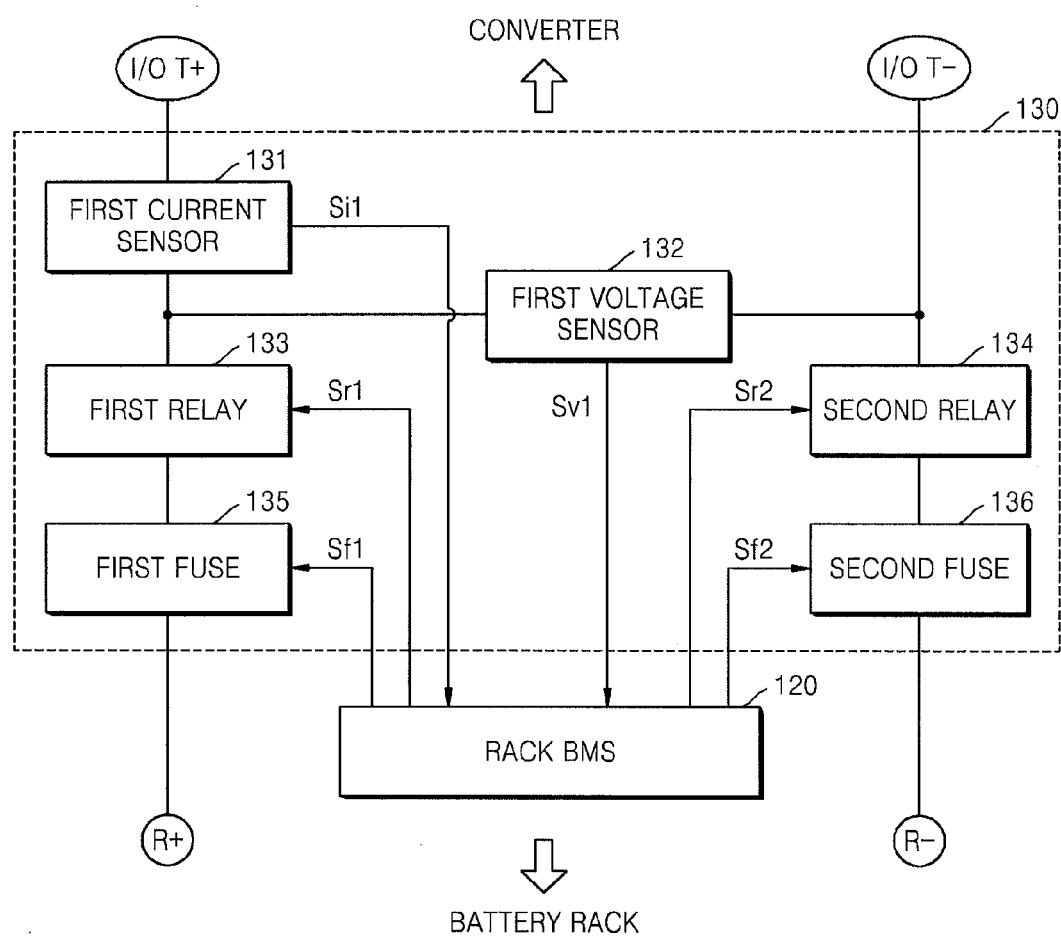
FIG. 4 is a block diagram of a rack protection circuit according to an embodiment.

Hereinafter, the rack protection circuit 130 is described in detail with reference to FIG. 4, which is a block diagram of the rack protection circuit 130 according to an embodiment. Referring to FIG. 4, the rack protection circuit 130 includes a first current sensor 131, a first voltage sensor 132, a first relay 133, a second relay 134, a first fuse 135, and a second fuse 136.

The first current sensor 131 measures a current that flows from the positive output terminal R+ of the battery rack 110 to the positive input/output terminal I/O T+. The first current sensor 131 transmits a signal Si1 corresponding to the measured current to the rack BMS 120. Although the magnitude of current that flows from the positive input/output terminal I/O T+ to the positive output terminal R+ of the battery rack 110 is measured in the present embodiment, other embodiments may make other measurements. For example, a magnitude of current that flows from the negative input/output terminal I/O T− to the negative output terminal R− of the battery rack 110 may be measured.

The first voltage sensor 132 measures an output voltage of the battery rack 110. The first voltage sensor 132 transmits a signal Sv1 corresponding to the measured voltage to the rack BMS 120.

The first relay 133 is a switching device and controls a flow of current from the positive output terminal R+ of the battery rack 110 to the converter 14. The first relay 133 receives a first relay control signal Sr1 from the rack BMS 120, and performs on and off operations according to the first relay control signal Sr1. Likewise, the second relay 134 is a switching device and controls a flow of current from the negative input/output terminal I/O T− to the negative output terminal R− of the battery rack 110. The second relay 134 receives a second relay control signal Sr2 from the rack BMS 120, and performs on and off operations according to the second relay control signal Sr2. The first relay 133 and the second relay 134 may use various switching devices capable of performing switching operations. However, since output current and voltage may have very large magnitude, the switching devices must endure large current and voltage.

The first fuse 135 is formed on a high current path from the positive output terminal R+ to the positive input/output terminal I/O T+, and, if overcurrent flows in the high current path, the first fuse 135 permanently blocks the high current path. The first fuse 135 may automatically block the high current path according to a magnitude of current flowing on the high current path. Alternatively, the first fuse 135 may receive a first fuse control signal Sf1 from the rack BMS 120, and permanently or temporarily block the high current path based on the received first fuse control signal Sf1.

The second fuse 136 is formed on a high current path from the negative input/output terminal I/O T− to the negative output terminal R−, and, if overcurrent flows in the high current path, the second fuse 136 permanently blocks the high current path. The second fuse 136 may automatically block the high current path according to a magnitude of current flowing on the high current path. Alternatively, the second fuse 136 may receive a second fuse control signal Sf2 from the rack BMS 120, and permanently or temporarily block the high current path by the received second fuse control signal Sf2.

In some embodiments, the rack protection circuit 130 is physically separated from the rack BMS 120. The rack BMS 120 is configured to control the rack protection circuit 130 according to one or more signal lines. That is, in some embodiments, the rack protection circuit 130 and the rack BMS 120 are formed in separate boards. Thus, a high current path to the rack protection circuit 130 does not pass through the rack BMS 120 or through or on a board comprising the rack BMS 120. Accordingly a first component of the system has the rack protection circuit 130 and does not have the rack BMS 120. Additionally, a second component of the system has the rack BMS 120 and does not have the rack protection circuit 130.

A battery pack used in a portable device may have very small magnitudes of voltage and current, and thus a BMS for controlling a protection circuit and the battery pack is formed on a single printed circuit board (PCB). A current path that connects the battery and an external output terminal is configured to pass through the BMS or the PCM in which the BMS is formed.

The battery rack 110 used in an energy storage system may have a very large voltage and/or current output. Magnitudes of voltage and current output from the battery rack 110 are may be much larger than the voltage and current used in the rack BMS 120. Thus, if the rack protection circuit 130 and the rack BMS 120 are configured to be formed on a single board, for example, a PCB, the rack BMS 120 may be likely damaged due to the magnitudes of voltage and current in the rack protection circuit 130.

Figure 5:
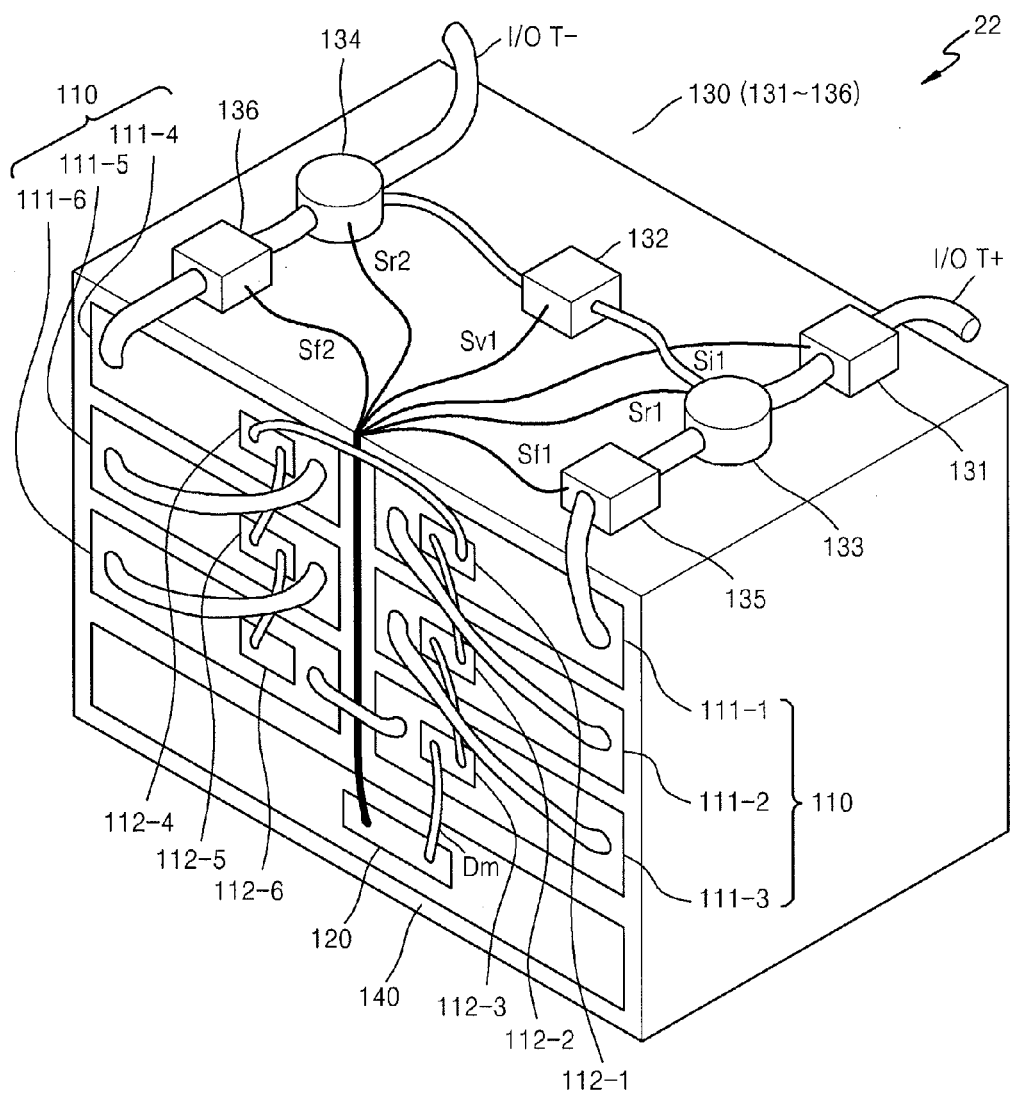
FIG. 5 is a perspective view of a battery system according to an embodiment.

FIG. 5 is a perspective view of a battery system 22 according to an embodiment. Referring to FIG. 5, the battery system 22 includes a rack frame 140, a battery rack 110, a rack BMS 120, and a rack protection circuit 130. The rack frame 140 holds the other elements of the battery system 22.

The battery rack 110 includes a first battery tray 111-1 through a sixth battery tray 111-6. Each of the battery trays 111-1 through 111-6 includes a first tray BMS 112-1 through a sixth tray BMS 112-6 that monitor voltages, current, etc. thereof for controlling charging and discharging. In the battery rack 110 of the present embodiment, the six battery trays 111-1 through 111-6 are connected to each other in series and output power to the rack protection circuit 130.

Meanwhile, in the tray BMS 112-1 through 112-6, data regarding results of the monitoring is sequentially transmitted from the sixth tray BMS 112-6 positioned in a left lower end to the fourth tray BMS 112-4 positioned in a left upper end. The fourth tray BMS 112-4 collects the received data and transmits the collected data to the first tray BMS 112-1 positioned in a right upper end. In addition, Data regarding results of the monitoring is sequentially transmitted from the first tray BMS 112-1 to the third tray BMS 112-3 positioned in a right lower end. The third tray BMS 112-3 transmits the collected monitoring data Dm to the rack BMS 120.

The rack BMS 120 receives the monitoring data Dm from the third tray BMS 112-3, and signals Si1 and Sv1 indicating results of the voltage and current measurements from the rack protection circuit 130. The rack BMS 120 may transmit control signals for controlling the first tray BMS 112-1 through the sixth tray BMS 112-6 through the third tray BMS 112-3, and transmit the first and second relay control signals Sr1 and Sr2 for controlling the first and second relays 133 and 134, respectively, included in the rack protection circuit 130.

The rack protection circuit 130 supplies power from the battery rack 110. More specifically, a first main power line or positive input/output terminal I/O T+ from the first battery tray 111-1 is connected to the first fuse 135, and power of the first main power line I/O T+ is output through the first relay 133 and the first current sensor 131. A second main power line or positive input/output terminal I/O T− from the fourth battery tray 111-4 is connected to the second fuse 136, and power of the second main power line is output through the second relay 134.

The first current sensor 131 and the first voltage sensor 132 measure output voltage and current of the battery rack 110, and transmit the signals Si1 and Sv1 corresponding to results of the measurement to the rack BMS 120. The first and second relay control signals Sr1 and Sr2 received from the rack BMs 120 are used to control on and off operations of the first relay 133 and the second relay 134, which flows current through the first main power line I/O T+ and the second main power line I/O T− or blocks a flow of the current. The first fuse 135 and the second fuse 136 block high current paths formed by the first main power line I/O T+ and the second main power line I/O T− according to a fuse control signals Sf1 and Sf2 received from the rack BMS 120.

Each element of the rack protection circuit 130 is physically separated from the rack BMS 120. The first main power line I/O T+ and the second main power line I/O T− that are used as the high current paths are configured to output power through a path not included in the rack BMS 120. Although each element of the rack protection circuit 130 is positioned in an upper end of the rack frame 140, other arrangements are possible. For example, the rack protection circuit 130 may be formed in a side surface of the rack frame 140 or in a separate frame. Alternatively, for example, the rack protection circuit 130 may be installed in a space separately prepared in the rack frame 14, like the battery trays 111-1, . . . 111-6.

Although not shown, the battery system 22 may include a power supply device for supplying power used to operate the tray BMSs 112-1 through 112-6 and the rack BMS 120. As described above, the energy storage system 1 including the battery systems 20 through 22 may enable a battery management unit such as the rack BMS 120 to stably operate although magnitudes of current and voltage output from the battery rack 110 increase.

Figure 6:
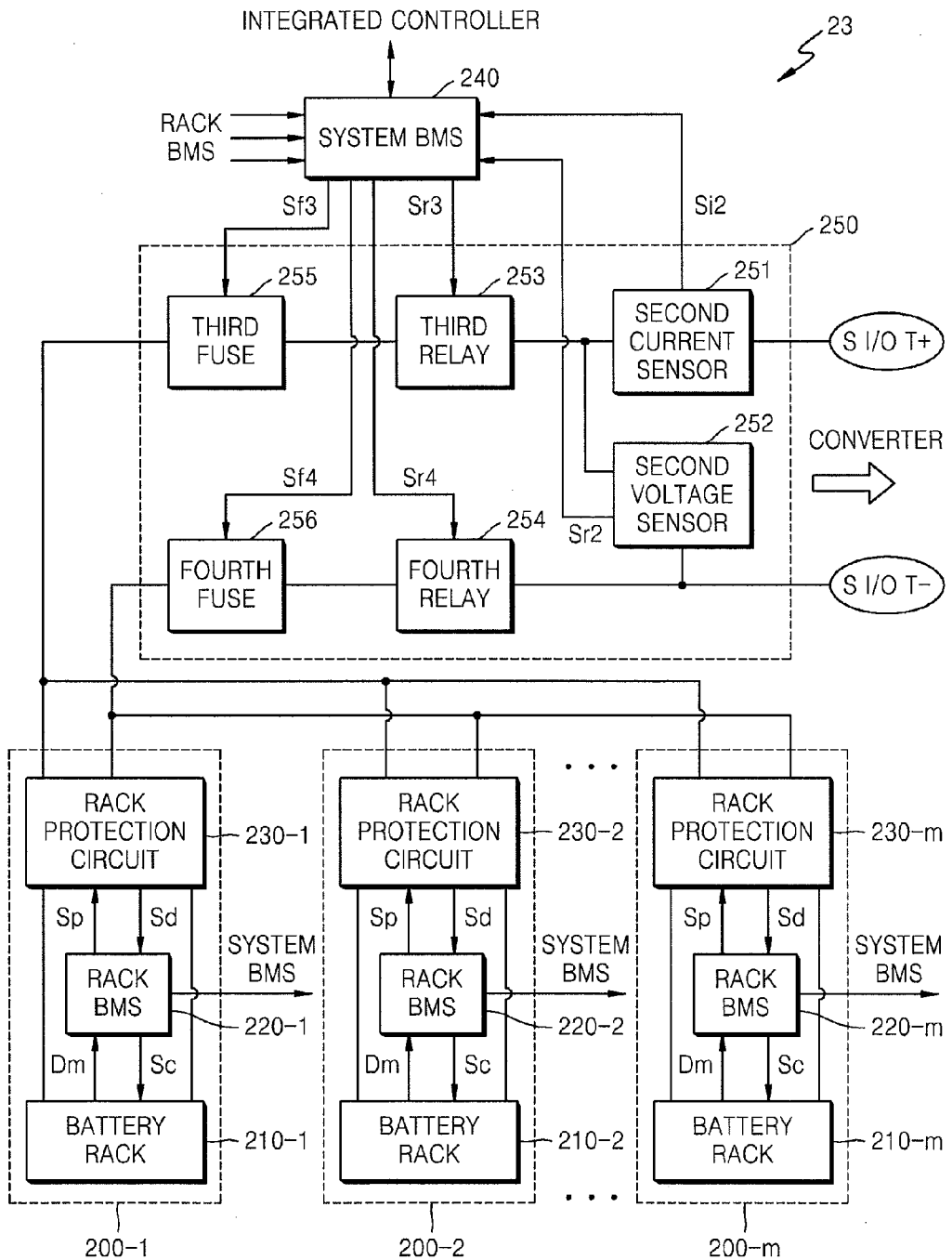
FIG. 6 is a block diagram of a battery system according to another embodiment.

FIG. 6 is a block diagram of a battery system 23 according to another embodiment. Referring to FIG. 6, the battery system 23 includes a plurality of sub battery systems 200-1, . . . 200-m, a system BMS 240, and an integrated protection circuit 250 connected to a converter through input/output terminals S I/O T+ and S I/O T−.

The number of the sub battery systems 200-1, . . . **200-*m* may be determined in accordance with power capacity, design condition, etc. required by the energy storage system 1. The operations of the sub battery systems 200-1, . . . 200-*m* may be substantially the same as those of the battery systems 20 through 22 described with reference to FIGS. 2 through 5**.

The system BMS 240 receives various types of data from rack BMSs 220-1 . . . **220-*m* respectively included in the sub battery systems 200-1, . . . 200-*m*, and controls the integrated protection circuit 250 based on the received data. The system BMS 240 may transmit the received data to the integrated protection circuit 250, and receive instructions used to control the sub battery systems 200-1, . . . 200-*m* from the integrated protection circuit 250**.

The integrated protection circuit 250 may include a second current sensor 251, a second voltage sensor 252, a third relay 253, a fourth relay 254, a third fuse 255, and a fourth fuse 256. The operations of the elements of the integrated protection circuit 250 may be substantially the same as those of the rack protection circuit 130 described with reference to FIG. 4.

The sub battery systems 200-1, . . . **200-*m* physically separate the rack BMSs 220-1 . . . 220-*m* and rack protection circuits 230-1 . . . 230-*m* as described with reference to FIGS. 2 through 5. For example, the rack BMSs 220-1 . . . 220-*m* and the rack protection circuits 230-1 . . . 230-*m* may be formed on separate boards. Thus, a high current path from battery racks 210-1 . . . 210-*m* to the integrated protection circuit 250 does not pass through the rack BMSs 220-1 . . . 220-*m***.

The system BMS 240 and the integrated protection circuit 250 are physically separated from each other. For example, the system BMS 240 and the integrated protection circuit 250 may be formed on separate boards. Thus, a high current path through which is current output from the sub battery systems 200-1, . . . **200-*m* does not pass through the system BMS 240**.

As described above, an energy storage system 1 including the battery system 23 may enable a battery management unit such as the rack BMSs 220-1 . . . **220-*m* or the system BMS 240 to stably operate with high magnitudes of current and voltage output from the battery racks 210-1 . . . 210-*m***.

Although not shown, in some embodiments, the PCS 10 is mounted in a frame including any of the battery systems 20 through 23. In some embodiments, the battery system is separately manufactured as a product as shown in FIG. 5, whereas the energy storage system 1 is manufactured as a product by mounting the PCS 10 in the battery systems 20 through 23.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A battery system, comprising:
    a battery rack configured to provide power to an input/output terminal of the battery system and to store power from the input/output terminal of the battery system, the battery system including a positive input/output terminal and a negative input/output terminal;
    a rack protection circuit connected to the battery rack, wherein the rack protection circuit is configured to selectively connect and disconnect the battery rack to and from the positive and negative input/output terminals of the battery system, wherein connecting and disconnecting the battery rack from the positive input/output terminal of the battery system is unrelated to connecting and disconnecting the battery rack from the negative input/output terminal of the battery system; and
    a rack battery management system (BMS) connected directly to the battery rack and configured to communicate with the battery rack over a single communication path and with the rack protection circuit, wherein the rack BMS is configured to receive data from the battery rack and to generate control signals for the rack protection circuit and for the battery rack,
    wherein the rack protection circuit comprises a current path between the battery rack and the input/output terminals of the battery system, and wherein the rack BMS is excluded from the current path.

2. The system of claim 1, further comprising a power conversion system (PCS) connected to the input/output terminals of the battery system and configured to convert forms of the power to and from the input/output terminals of the battery system, wherein conversion of the forms is at least one selected from the group consisting of between DC and AC and between a first voltage and a second voltage.

3. The system of claim 1, wherein the rack BMS is formed in a separate piece from the rack protection circuit.

4. The system of claim 1, wherein the battery rack comprises one or more battery trays, each battery tray having plurality battery cells, wherein each battery tray is configured to store at least a portion of the power.

5. The system of claim 4, wherein the battery rack further comprises a plurality of tray BMSs, wherein each tray BMS is configured to monitor operation of its corresponding one of the battery trays.

6. The system of claim 5, wherein each tray BMS is configured to generate information about its corresponding battery tray for providing to the rack BMS.

7. The system of claim 6, wherein the data from the battery rack comprises the information, wherein the rack BMS is configured to generate the control signals for the rack protection circuit using the information.

8. The system of claim 1, wherein the rack protection circuit is configured to selectively connect and disconnect the current path between the battery rack and the input/output terminals of the battery system according to the control signals.

9. The system of claim 1, wherein the rack protection circuit comprises a sensor configured to sense either or both of a voltage and a current of the power through the input/output terminals of the battery system, wherein the sensor is further configured to generate a signal for the rack BMS based on the sensed voltage or current, wherein the rack BMS is configured to generate the control signals based on the signal from the sensor.

10. The system of claim 1, wherein the rack protection circuit comprises at least one switching device in the current path, wherein the at least one switching device is configured to receive a switching device control signal from the rack BMS and to selectively connect and disconnect the input/output terminals of the battery system to and from the battery rack according to the switching device control signal.

11. The system of claim 1, wherein the rack protection circuit further comprises at least one fuse device in the current path, wherein the at least one fuse device is configured to receive a fuse device control signal from the rack BMS and to disable connection between the input/output terminals of the battery system and the battery rack according to the fuse device control signal, wherein disabling the connection is in a manner such that enabling the connection requires replacement of a component.

12. A battery system, comprising:
a plurality of sub-battery, systems configured to provide power to a system input/output terminal and to store power from the system input/output terminal, each sub-battery system comprising:
  a battery rack configured to provide power to a sub-battery system input/output terminal and to store power from the sub-battery system input/output terminal, the sub-battery system including a positive input/output terminal and a negative input/output terminal,
  a rack protection circuit connected to the battery rack, wherein the rack protection circuit is configured to selectively connect and disconnect the battery rack and the sub-battery system positive and negative input/output terminals, wherein connecting and disconnecting the battery rack from the positive input/output terminal of the batter s stem is unrelated to connecting and disconnecting the battery rack from the negative input/output terminal of the battery system, and
  a rack battery management system (BMS) connected directly to the battery rack and configured to communicate with the battery rack over a single communication path and with the rack protection circuit, wherein the rack BMS is configured to receive data from the battery rack and to generate control signals for the rack protection circuit based on the data from the battery rack;
an integrated protection circuit connected to the sub-battery systems; and
a system BMS configured to communicate with the rack BMS of each of the-sub battery systems and with the integrated protection circuit, wherein the system BMS is configured to receive data from the sub-battery systems and to generate control signals for the integrated protection circuit,
wherein the integrated protection circuit comprises a current path between the system input/output terminal and sub-battery system input/output terminals, and wherein the system BMS does not include the current path.

13. The system of claim 12, wherein the system BMS and the integrated protection circuit are formed as separate components.

14. The system of claim 12, wherein the battery rack of each sub-battery system comprises:
  one or more battery trays, each battery tray having one or more battery cells, wherein each battery tray is configured to store at least a portion of the power, and
  one or more tray BMSs, wherein each tray BMS is configured to monitor operation of its corresponding one of the battery trays.

15. The system of claim 14, wherein each tray BMS is configured to generate information about it corresponding battery tray for providing to the rack BMS of the sub-battery system.

16. The system of claim 15, wherein the rack BMS of each sub-battery system is configured to generate the control signals for the rack protection circuit of its sub-battery system using the information.

17. The system of claim 16, wherein the rack protection circuit of each sub-battery system is configured to selectively connect and disconnect the battery rack of the sub-battery system to and from the sub-battery system input/output terminals according to the control signals.

18. The system of claim 12, wherein the rack protection circuit of each sub-battery system comprises a sensor configured to sense either or both of a voltage and a current of the power through the sub-battery system input/output terminals, wherein the sensor is further configured to generate a signal for the rack BMS based on the sensed voltage or current, wherein the rack BMS is configured to generate the control signals based on the signal from the sensor for providing to the rack protection circuit.

19. The system of claim 12, wherein the integrated protection circuit comprises at least one switching device in the current path, wherein the at least one switching device is configured to receive a switching device control signal from the system BMS and to selectively connect and disconnect the system input/output terminal to and from the sub-battery system input/output terminals according to the switching device control signal.

20. The system of claim 12, wherein the integrated protection circuit comprises a sensor configured to sense either or both of a voltage and a current of the power through the system input/output terminal, wherein the sensor is further configured to generate a signal for the system BMS based on the sensed voltage or current, wherein the system BMS is configured to generate the control signals based on the signal from the sensor for providing to the integrated protection circuit.

21. The system of claim 12, wherein the integrated protection circuit further comprises at least one fuse device in the current path, wherein the at least one fuse device is configured to receive a fuse device control signal from the system BMS and to disable connection between the system input/output terminal and the sub-battery system input/output terminals according to the fuse device control signal, wherein disabling the connection is in a manner such that enabling the connection requires replacement of a component of the fuse device.

22. The system of claim 6, wherein only one of the plurality of tray BMSs is connected directly to the rack BMS and configured to collect the information generated by the plurality of tray BMSs, communicate the information to the rack BMS, and receive the control signals from the rack BMS.

23. The system of claim 16, wherein only one of the one or more tray BMSs is connected directly to the rack BMS of the sub-battery system and configured to collect the information generated by the one or more tray BMSs, communicate the information to the rack BMS of the sub-battery system, and receive the control signals from the rack BMS of the sub-battery system.

* * * * *